(12) United States Patent
Yamaguchi et al.

(10) Patent No.: US 11,926,432 B2
(45) Date of Patent: Mar. 12, 2024

(54) FUEL TANK DAM

(71) Applicant: MITSUBISHI HEAVY INDUSTRIES, LTD., Tokyo (JP)

(72) Inventors: Eizaburo Yamaguchi, Tokyo (JP); Tadasuke Kurita, Nagoya (JP); Hajime Tada, Tokyo (JP); Akihiko Hirota, Tokyo (JP); Akihisa Okuda, Tokyo (JP); Kana Sakon, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 441 days.

(21) Appl. No.: 17/046,640

(22) PCT Filed: May 21, 2019

(86) PCT No.: PCT/JP2019/020004
§ 371 (c)(1),
(2) Date: Oct. 9, 2020

(87) PCT Pub. No.: WO2020/017144
PCT Pub. Date: Jan. 23, 2020

(65) Prior Publication Data
US 2021/0107673 A1    Apr. 15, 2021

(30) Foreign Application Priority Data

Jul. 20, 2018   (JP) ................................ 2018-136771

(51) Int. Cl.
*B64D 37/08* (2006.01)
*B64C 3/34* (2006.01)
(Continued)

(52) U.S. Cl.
CPC ............... *B64D 37/08* (2013.01); *B64C 3/34* (2013.01); *B64D 37/005* (2013.01); *B64D 37/32* (2013.01); *B64D 2037/325* (2013.01)

(58) Field of Classification Search
CPC ........ B64D 37/08; B64D 37/005; B64C 3/34; B64C 3/182; B64C 3/187
See application file for complete search history.

(56) References Cited

U.S. PATENT DOCUMENTS 8,167,245 B1    5/2012  Koehler
2015/0336140 A1*  11/2015  Hansen .................... B08B 9/08
                                                   156/753
(Continued)

FOREIGN PATENT DOCUMENTS

EP    2502824 A2    9/2012
EP    3012186 A1    4/2016
(Continued)

OTHER PUBLICATIONS

PCT/ISA/210, "International Search Report for International Application No. PCT/JP2019/020004," dated Jul. 9, 2019.
(Continued)

*Primary Examiner* — Philip J Bonzell
*Assistant Examiner* — Ashesh Dangol
(74) *Attorney, Agent, or Firm* — Manabu Kanesaka; Benjamin Hauptman; Kenneth Berner

(57) ABSTRACT

This fuel tank dam closes a gap between a first structural component fixed to the inside surface of the outer plate of a fuel tank and a second structural component provided with a cutout part into which the first structural component is inserted. This fuel tank dam includes: a first portion that can be fixed to the first structural component; a second portion that has a surface extending in a direction intersecting with the first portion and can be fixed to the second structural component; and a third portion that has a bellows and is disposed between the first portion and the second portion. This fuel tank dam is configured such that the first portion, the second portion, and the third portion are integrated, the (Continued)

bellows has a thickness of 0.381 to 1.524 mm, and the second portion has a thickness of 0.762 to 7.620 mm.

4 Claims, 11 Drawing Sheets

(51) Int. Cl.
  *B64D 37/00* (2006.01)
  *B64D 37/32* (2006.01)

(56) References Cited

U.S. PATENT DOCUMENTS

2016/0159490 A1\* 6/2016 Yamaguchi ............ B64D 37/08
  220/734
2020/0189715 A1\* 6/2020 Yamaguchi ............... B64C 3/34

FOREIGN PATENT DOCUMENTS

EP        3608219 A1    2/2020
JP     2015-054581 A    3/2015

OTHER PUBLICATIONS

PCT/ISA/237, "Written Opinion of the International Searching Authority for International Application No. PCT/JP2019/020004," dated Jul. 9, 2019.

\* cited by examiner

FUEL TANK DAM

TECHNICAL FIELD

The present invention relates to a fuel tank dam.

Priority is claimed on Japanese Patent Application No. 2018-136771 filed on Jul. 20, 2018, the content of which is incorporated herein by reference.

BACKGROUND ART

In an aircraft, a fuel tank is provided in a main wing or the like. The fuel tank is composed of a plurality of structural members such as a skin, a stringer, and a rib. In such a fuel tank, there is a case where a cutout portion for inserting the stringer is formed in the rib. There is a case where the rib and the stringer are relatively displaced due to a force from the outside. For this reason, a fuel tank dam is used to close a gap between the rib and the stringer while allowing the relative displacement between the rib and the stringer.

PTL 1 discloses a technique for suppressing a decrease in sealing properties by providing a fuel tank dam having a bellows to follow deformation, in a fuel tank provided in a main wing of an aircraft or the like.

CITATION LIST

Patent Literature

[PTL 1] Japanese Unexamined Patent Application Publication No. 2015-54581

SUMMARY OF INVENTION

Technical Problem

However, in the fuel tank dam described in PTL 1, there is a case where not only the bellows but also parts other than the bellows are deformed, and thus there is a case where the sealing properties decrease.

The present invention has been made in view of the above circumstances and has an object to provide a fuel tank dam that can suppress a decrease in sealing properties.

Solution to Problem

According to a first aspect of the present invention, there is provided a fuel tank dam that closes a gap between a first structural component fixed to an inner surface of an outer plate of a fuel tank and a second structural component having a cutout portion into which the first structural component is inserted, the fuel tank dam including: a first section configured to be fixed to the first structural component; a second section having a surface extending in a direction intersecting with the first section, and configured to be fixed to the second structural component; and a third section having a bellows provided with at least one folded portion, and disposed between the first section and the second section, in which the first section, the second section, and the third section are integrated, the bellows has a thickness in a range of 0.381 to 1.524 mm, and the second section has a thickness in a range of 0.762 to 7.620 mm.

According to this aspect, since the bellows is maintained to be thin in relation to the second section, the bellows is easily deformed. If the bellows is easily deformed, the bellows can be deformed in a case where the first structural component and the second structural component are relatively displaced.

Therefore, since the deformation of parts other than the bellows can be suppressed, the fuel tank dam can suppress a decrease in sealing properties.

Further, according to a second aspect, in the fuel tank dam according to the first aspect, the thickness of the bellows is in a range of 0.381 to 1.016 mm.

According to this aspect, the pressure which is applied to the second section can be reduced.

Therefore, since the deformation of parts other than the bellows can be further suppressed, the fuel tank dam can suppress a decrease in sealing properties.

Further, according to a third aspect, in the fuel tank dam according to the first aspect, the thickness of the bellows is in a range of 0.635 to 1.016 mm.

According to this aspect, the formability of the bellows is improved.

Therefore, it is easy to process the bellows.

Further, according to a fourth aspect, in the fuel tank dam according to the third aspect, the thickness of the second section is in a range of 1.778 to 7.620 mm.

According to this aspect, since the second section is maintained to be thick in relation to the bellows, the second section is not easily deformed.

Therefore, since the deformation of parts other than the bellows can be further suppressed, the fuel tank dam can suppress a decrease in sealing properties.

Further, according to a fifth aspect, in the fuel tank dam according to the third aspect, the thickness of the second section is in a range of 1.778 to 4.064 mm.

According to this aspect, the weight of the second section is reduced.

Therefore, it is possible to reduce the weight of the fuel tank dam.

Further, according to a sixth aspect, in the fuel tank dam according to any one of the first to fifth aspects, a deformation rate of the bellows is 60% or more.

According to this aspect, the deformation of parts other than the bellows is suppressed.

Therefore, the fuel tank dam can suppress a decrease in sealing properties.

Further, according to a seventh aspect, in the fuel tank dam according to any one of the first to sixth aspects, the fuel tank dam further includes a continuous section connecting the second section and the third section, in which the continuous section has an R shape which does not intersect a surface which is in contact with an inner side of the third section, when the fuel tank is deformed.

According to this aspect, when the fuel tank is deformed, the continuous section does not easily protrude beyond the surface which is in contact with the inner side of the third section. Therefore, when the fuel tank is deformed, the third section does not easily interfere with the outer plate, the first structural component, or the like.

Further, according to an eighth aspect, in the fuel tank dam according to any one of the first to sixth aspects, the fuel tank dam further includes a continuous section connecting the second section and the third section, in which when the fuel tank is deformed, the continuous section maintains an R shape which gets away from a surface which is in contact with an inner side of the third section, with increasing distance from the third section.

According to this aspect, when the fuel tank is deformed, the continuous section does not easily protrude beyond the surface which is in contact with the inner side of the third section. Therefore, when the fuel tank is deformed, the third section does not easily interfere with the outer plate, the first structural component, or the like.

Advantageous Effects of Invention

According to the aspects described above, a decrease in sealing properties can be suppressed.

DESCRIPTION OF EMBODIMENTS

Figure 1:
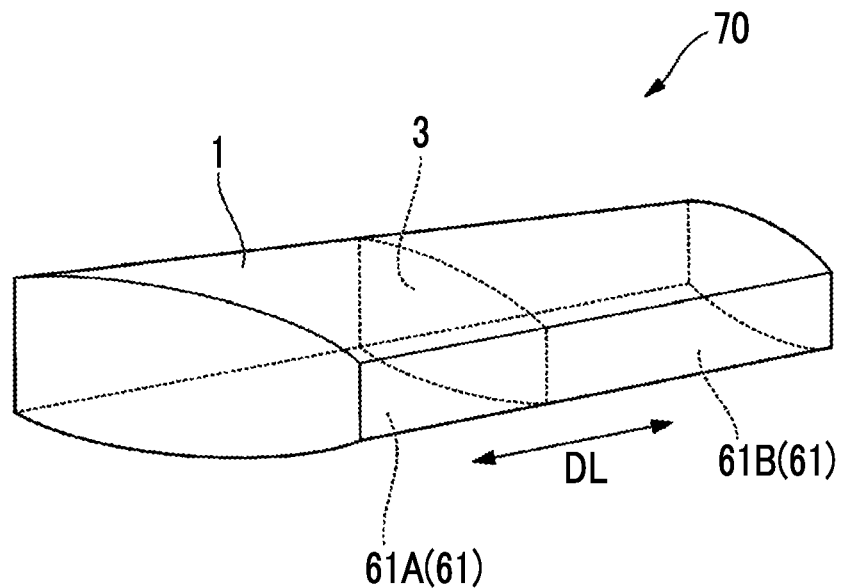
FIG. 1 is a perspective view showing a schematic configuration of a main wing in a first embodiment.
Figure 2:
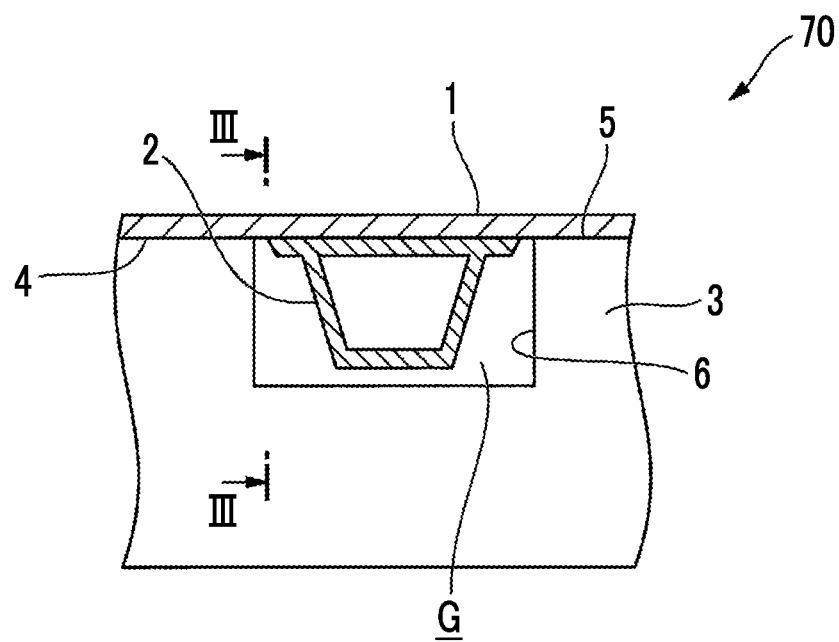
FIG. 2 is an enlarged sectional view of the periphery of a stringer of the main wing in the first embodiment.
Figure 3:
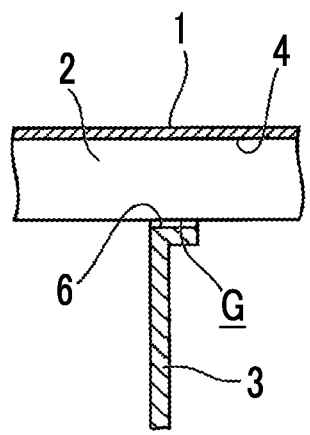
FIG. 3 is a sectional view taken along line III-III in FIG. 2.

First Embodiment (Configuration)
FIG. 1 is a perspective view showing a schematic configuration of a main wing in a first embodiment. FIG. 2 is an enlarged sectional view of the periphery of a stringer of the main wing in the first embodiment. FIG. 3 is a sectional view taken along line III-III in FIG. 2.

As shown in FIGS. 1 to 3, a main wing 70 includes a skin (an outer plate) 1, a stringer (a first structural component) 2, and a rib (a second structural component) 3. In FIG. 1, the illustration of the stringer 2 is omitted.

The skin 1 is a plate material which defines the outer shape of the main wing 70. A fuel tank 61 is provided in the interior of the main wing 70 surrounded by the skin 1.

The stringer 2 is a strength member which extends in a longitudinal direction DL (refer to FIG. 1) of the main wing 70. As shown in FIGS. 2 and 3, the stringer 2 is fixed to an inner surface 4 of the skin 1. The stringer 2 illustrated in this embodiment is formed in a tubular shape having a hollow trapezoidal cross section in which a width decreases with increasing distance from the skin 1, as shown in FIG. 2. The shape of the stringer 2 is not limited to the shape illustrated in this embodiment.

As shown in FIG. 1, the rib 3 is provided in the interior of the main wing 70. The rib 3 has, for example, a thin plate shape which extends in a direction intersecting the stringer 2. The rib 3 partitions the interior of the main wing 70, for example, in the longitudinal direction DL. In this manner, the interior of the main wing 70 is partitioned by the rib 3, whereby a plurality of fuel tanks 61A and 61B are formed side by side in the longitudinal direction DL.

As shown in FIGS. 2 and 3, the rib 3 has a cutout portion 6 at a part of an end edge 5 which is joined to the skin 1. The cutout portion 6 is formed in a recessed shape toward the central portion of the rib 3 from the end edge 5 of the rib 3. The cutout portion 6 is formed such that the stringer 2 can be inserted in the longitudinal direction DL. Due to the cutout portion 6, the rib 3 and the stringer 2 are not in direct contact with each other.

A gap G is formed between the rib 3 and the stringer 2.

Figure 4:
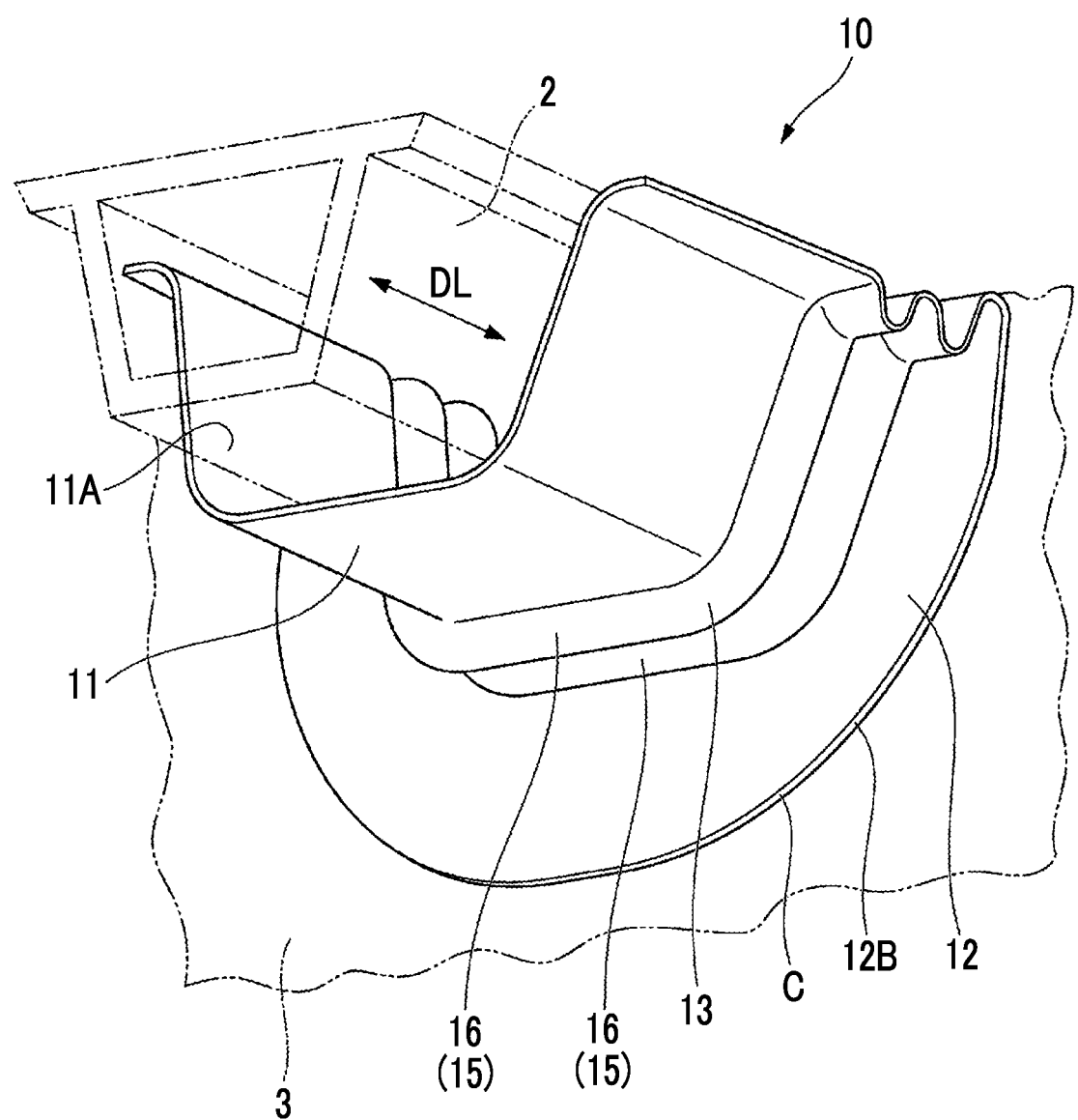
FIG. 4 is a perspective view of a fuel tank dam in the first embodiment.
Figure 5:
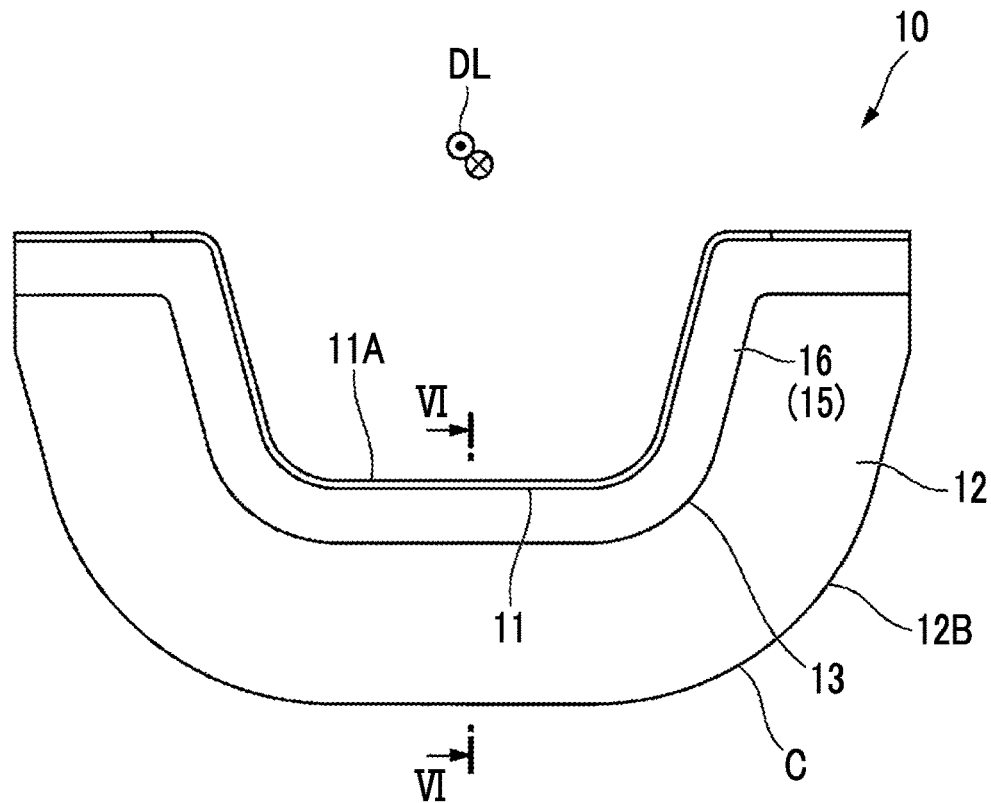
FIG. 5 is a front view of the fuel tank dam in the first embodiment as viewed from the first section side.
Figure 6:
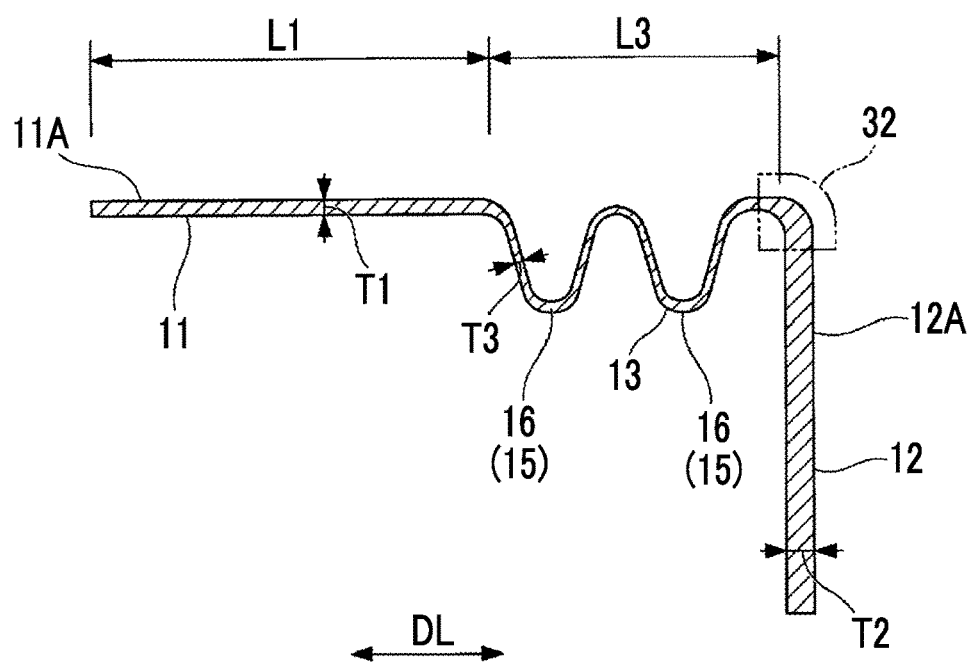
FIG. 6 is a sectional view taken along line VI-VI in FIG. 5.

FIG. 4 is a perspective view of a fuel tank dam in the first embodiment. FIG. 5 is a front view of the fuel tank dam in the first embodiment as viewed from the first section side. FIG. 6 is a sectional view taken along line VI-VI in FIG. 5.

The gap G between the rib 3 and the stringer 2 described above is closed by a fuel tank dam 10.

As shown in FIGS. 4 and 5, the fuel tank dam 10 includes a first section 11, a second section 12, and a third section 13.

As shown in FIG. 6, the fuel tank dam 10 further includes a continuous section 32 that connects the second section 12 and the third section 13.

The first section 11 is a part which is fixed to the stringer 2. The first section 11 is formed so as to have a U-shaped cross section which covers the stringer 2 from the outside. An inner surface 11A of the first section 11 is fixed to the stringer 2 by bonding or the like with a sealant (not shown) interposed therebetween, for example.

The second section 12 is a part which is fixed to the rib 3.

The second section 12 has a surface extending in a direction intersecting the first section 11. In this embodiment, the second section 12 has a thin plate shape that extends in the direction intersecting the first section 11. The second section 12 has a plate surface that is along the plate surface of the rib 3. The second section 12 has a surface 12A (refer to FIG. 6), which faces the side opposite to the first section 11 in the longitudinal direction DL and is fixed to the rib 3 by bonding or the like with a sealant interposed therebetween, for example. A case where a curved portion C that is convex toward the outside is formed at an outer edge 12B of the second section 12 illustrated in this embodiment is illustrated. However, the shape of the outer edge 12B of the second section 12 is not limited to this shape.

As shown in FIG. 6, a thickness T1 of the first section 11 illustrated in this embodiment is formed slightly thinner than a thickness T2 of the second section 12. However, the second section 12 and the first section 11 may have the same thickness, or the first section 11 may be formed thicker than the second section 12.

The third section 13 is disposed between the first section 11 and the second section 12.

The continuous section 32 connects the second section 12 and the third section 13.

The first section 11 and the second section 12 are connected through the third section 13 and the continuous section 32.

The first section 11, the second section 12, the third section 13, and the continuous section 32 are integrally formed of the same member so as to be continuous.

The first section 11, the second section 12, the third section 13, and the continuous section 32 can be formed of, for example, synthetic resin or the like.

The third section 13 has a bellows 15 composed of a plurality of folded portions 16. The bellows 15 in this embodiment has two folded portions 16.

The plurality of folded portions 16 are arranged in the longitudinal direction DL.

Each of the folded portions 16 is formed so as to protrude outward in a thickness direction of the first section 11. The folded portion 16 extends such that a ridgeline thereof is continuous in a direction intersecting the longitudinal direction DL that is a direction in which the stringer 2 extends. That is, each of the folded portions 16 is continuously formed so as to cover the stringer 2 in a U shape.

Here, the third section 13 is elastically deformed to allow the relative displacement of the first section 11 and the second section 12 according to the relative displacement of the stringer 2 and the rib 3 associated with the deformation of the main wing 70. The bellows 15 described above is formed to be thin, that is, to have a thin thickness, in relation to the thickness T2 of the second section 12, and is easily elastically deformed. More specifically, a thickness T3 of the bellows 15 is, as a whole, within the range shown in FIG. 7 with respect to the thickness T2 of the second section 12.

A case where the thickness of each of the bellows 15 and the second section 12 in this embodiment is uniform is illustrated. However, the thickness T3 of the bellows 15 may not be uniform as long as it is within the range shown in FIG. 7.

In a case where the bellows 15 is not uniform, the thickness T3 of the bellows 15 is set to be an average thickness of the entire bellows 15.

In a case where the second section 12 is not uniform, the thickness T2 of the second section 12 is set to be an average thickness of the entire second section 12.

Further, a length L3 of the third section 13 illustrated in this embodiment is formed shorter than a length L1 of the first section 11 in the longitudinal direction DL. In other words, the first section 11 is formed longer than the third section 13 in the longitudinal direction DL.

Figure 7:
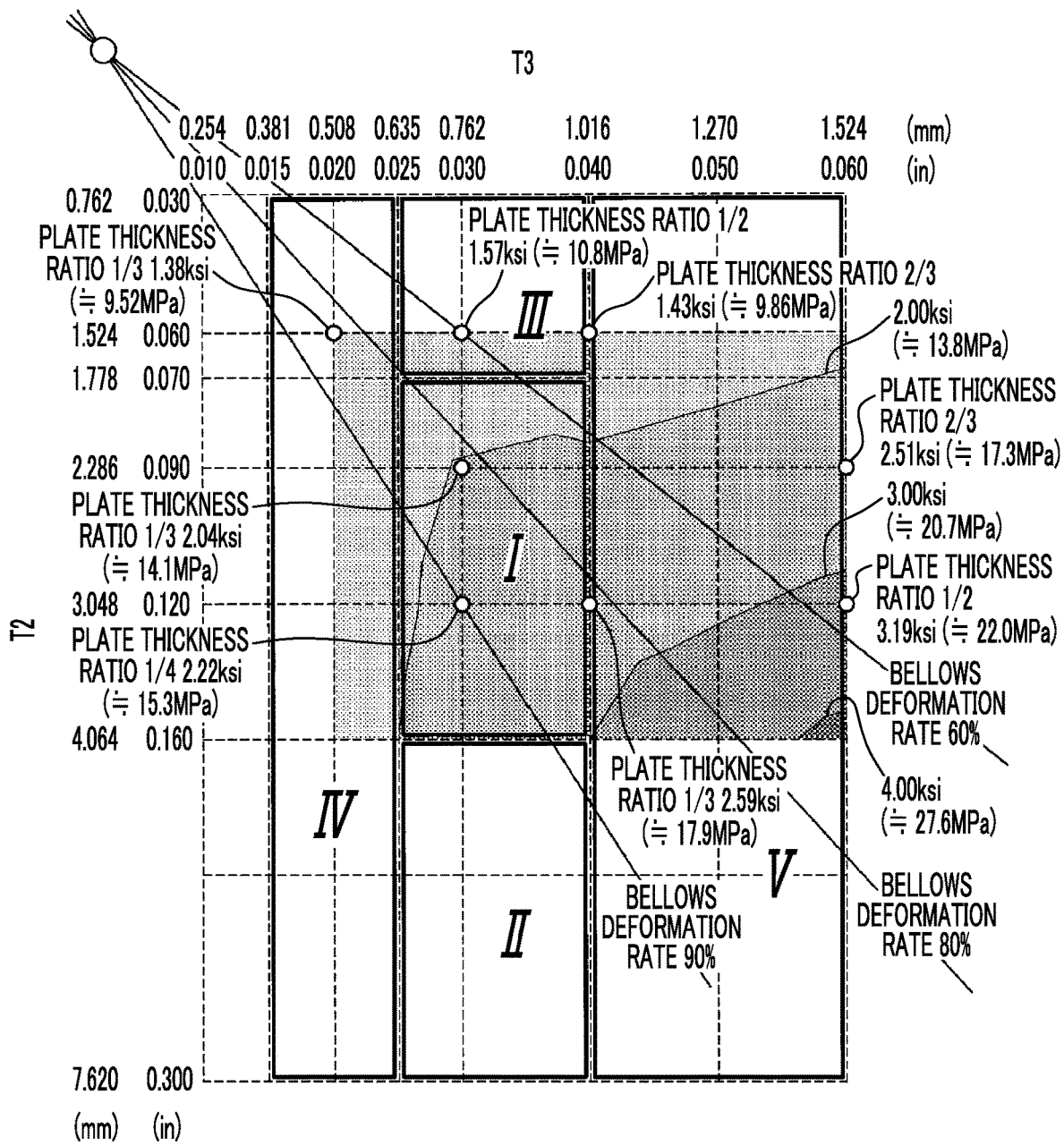
FIG. 7 is a diagram showing the relationship between the thickness of a bellows and the thickness of a second section of the fuel tank dam in the first embodiment.

For example, the relationship between the thickness T3 of the bellows 15 and the thickness T2 of the second section 12 may be within a range including regions I, II, III, IV, and V shown in FIG. 7. That is, the thickness T3 of the bellows 15 may be in a range of 0.381 to 1.524 mm (0.015 to 0.060 inches), and the thickness T2 of the second section 12 may be in a range of 0.762 to 7.620 mm (0.030 to 0.300 inches).

Here, the word "to" expresses a range which includes the indicated value itself. For example, the expression "0.381 to 1.524 mm" means "0.381 or more and 1.524 mm or less", and the expression "0.762 to 7.620 mm" means "0.762 or more and 7.620 mm or less".

The same applies to the following.

For example, the relationship between the thickness T3 of the bellows 15 and the thickness T2 of the second section 12 may be within a range including the regions I, II, III, and IV shown in FIG. 7. That is, the thickness T3 of the bellows 15 may be in a range of 0.381 to 1.016 mm (0.015 to 0.040 inches), and the thickness T2 of the second section 12 may be in a range of 0.762 to 7.620 mm (0.030 to 0.300 inches).

For example, the relationship between the thickness T3 of the bellows 15 and the thickness T2 of the second section 12 may be within a ranges including the regions I, II, and III shown in FIG. 7. That is, the thickness T3 of the bellows 15 may be in a range of 0.635 to 1.016 mm (0.025 to 0.040 inches), and the thickness T2 of the second section 12 may be in a range of 0.762 to 7.620 mm (0.030 to 0.300 inches).

For example, the relationship between the thickness T3 of the bellows 15 and the thickness T2 of the second section 12 may be within a range including the regions I and II shown in FIG. 7. That is, the thickness T3 of the bellows 15 may be in a range of 0.635 to 1.016 mm (0.025 to 0.040 inches), and the thickness T2 of the second section 12 may be in a range of 1.778 to 7.620 mm (0.070 to 0.300 inches).

For example, the relationship between the thickness T3 of the bellows 15 and the thickness T2 of the second section 12 may be within the range of the region I shown in FIG. 7. That is, the thickness T3 of the bellows 15 may be in a range of 0.635 to 1.016 mm (0.025 to 0.040 inches), and the thickness T2 of the second section 12 may be in a range of 1.778 to 4.064 mm (0.070 to 0.160 inches).

For example, the deformation rate of the bellows 15 may be 60% or more. Here, the deformation rate of the bellows 15 is the ratio of the deformation amount of the bellows 15 to the deformation amount of the entire fuel tank dam 10 in the direction in which the plurality of folded portions 16 are arranged, in a case where a constant load is applied to the surface 12A in the direction in which the plurality of folded portions 16 are arranged (the longitudinal direction DL).

For example, the deformation rate of the bellows 15 may be 80% or more. Further, the deformation rate of the bellows 15 may be 90% or more.

(Operation and Effect)

According to the fuel tank dam 10 of this embodiment, the thickness of the bellows 15 is related to the thickness of the second section 12 so as to be able to suppress a decrease in sealing properties.

For example, when the relationship between the thickness T3 of the bellows 15 and the thickness T2 of the second section 12 is within the range including the regions I, II, III, IV, and V, the thickness T3 of the bellows 15 is at least 1.524 mm or less with respect to the second section 12 having the thickness T2 in a range of 0.762 to 7.620 mm.

If the thickness T3 of the bellows 15 is maintained to be thin in relation to the second section 12, the bellows 15 is easily deformed.

If the bellows 15 is easily deformed, the bellows 15 can be deformed in a case where the stringer 2 and the rib 3 are relatively displaced.

Therefore, when it is within the range including the regions I, II, III, IV, and V, the deformation of parts other than the bellows 15 can be suppressed, and therefore, the fuel tank dam 10 can suppress a decrease in sealing properties.

For example, when the relationship between the thickness T3 of the bellows 15 and the thickness T2 of the second section 12 is within the range including the regions I, II, III, and IV, the thickness T3 of the bellows 15 is at least 1.016 mm or less with respect to the second section 12 having the thickness T2 in a range of 0.762 to 7.620 mm.

In FIG. 7, contour lines of the pressure which is applied to the second section 12 at each thickness T2 and each thickness T3 of the fuel tank dam 10 are shown. Further, in FIG. 7, a plate thickness ratio (=thickness T3/T2) at each representative point and the pressure which is applied to the second section 12 are shown. Here, the contour lines and the respective representative points shown in FIG. 7 show examples in a case where certain deformation occurs in the fuel tank 61.

As is clear from the contour lines shown in FIG. 7, for example, when the thickness T2 is constant, the smaller the thickness T3, the smaller the pressure which is applied to the second section 12 can be made.

As is clear from the representative points shown in FIG. 7, for example, at a constant plate thickness ratio (=thickness T3/T2), the smaller the thickness T3, the smaller the pressure which is applied to the second section 12 can be made.

Therefore, as compared with a case of being within the range of the region V, when it is within the range including the regions I, II, III, and IV, the deformation of parts other than the bellows 15 can be further suppressed, and therefore, the fuel tank dam 10 can suppress a decrease in sealing properties.

For example, when the relationship between the thickness T3 of the bellows 15 and the thickness T2 of the second section 12 is within the range including the regions I, II, and III, the thickness T3 of the bellows 15 is at least 0.635 mm or more with respect to the second section 12 having the thickness T2 in a range of 0.762 to 7.620 mm.

When the thickness T3 of the bellows 15 is 0.635 mm or more, the formability of the bellows 15 is improved.

Therefore, as compared with a case of being within the range of the region IV, when it is within the range including the regions I, II, and III, the bellows 15 is more easily processed.

For example, when the relationship between the thickness T3 of the bellows 15 and the thickness T2 of the second section 12 is within the range including the regions I and II, the thickness T2 of the second section 12 is at least 1.778 mm or more with respect to the bellows 15 having the thickness T3 in a range of 0.635 to 1.016 mm.

If the thickness T2 of the second section 12 is maintained to be thick in relation to the bellows 15, the second section 12 is not easily deformed.

Therefore, as compared with a case of being within the range of the region III, when it is within the range including the regions I and II, the deformation of parts other than the bellows 15 can be further suppressed, and therefore, the fuel tank dam 10 can further suppress a decrease in sealing properties.

For example, when the relationship between the thickness T3 of the bellows 15 and the thickness T2 of the second section 12 is within the range of the region I, the thickness T2 of the second section 12 is at least 4.064 mm or less with respect to the bellows 15 having the thickness T3 in a range of 0.635 to 1.016 mm.

When the thickness T2 is 4.064 mm or less with respect to the bellows 15, the weight of the second section 12 is reduced.

Therefore, as compared with a case of being within the range of the region II, when it is within the range of the region I, the fuel tank dam 10 can be made lighter.

For example, when the deformation rate of the bellows 15 is 60% or more, the deformation amount of the bellows 15 is maintained to be large with respect to the entire fuel tank dam 10.

Therefore, the deformation of parts other than the bellows 15 can be suppressed.

Therefore, the fuel tank dam 10 can suppress a decrease in sealing properties.

If the deformation rate of the bellows 15 is further increased, the deformation of parts other than the bellows 15 can be further suppressed.

The structures other than the bellows 15 and the second section 12 (for example, the structure of the first section 11) also slightly affect the sealing properties of the fuel tank dam 10. However, the trends described above do not significantly change.

Figure 8:
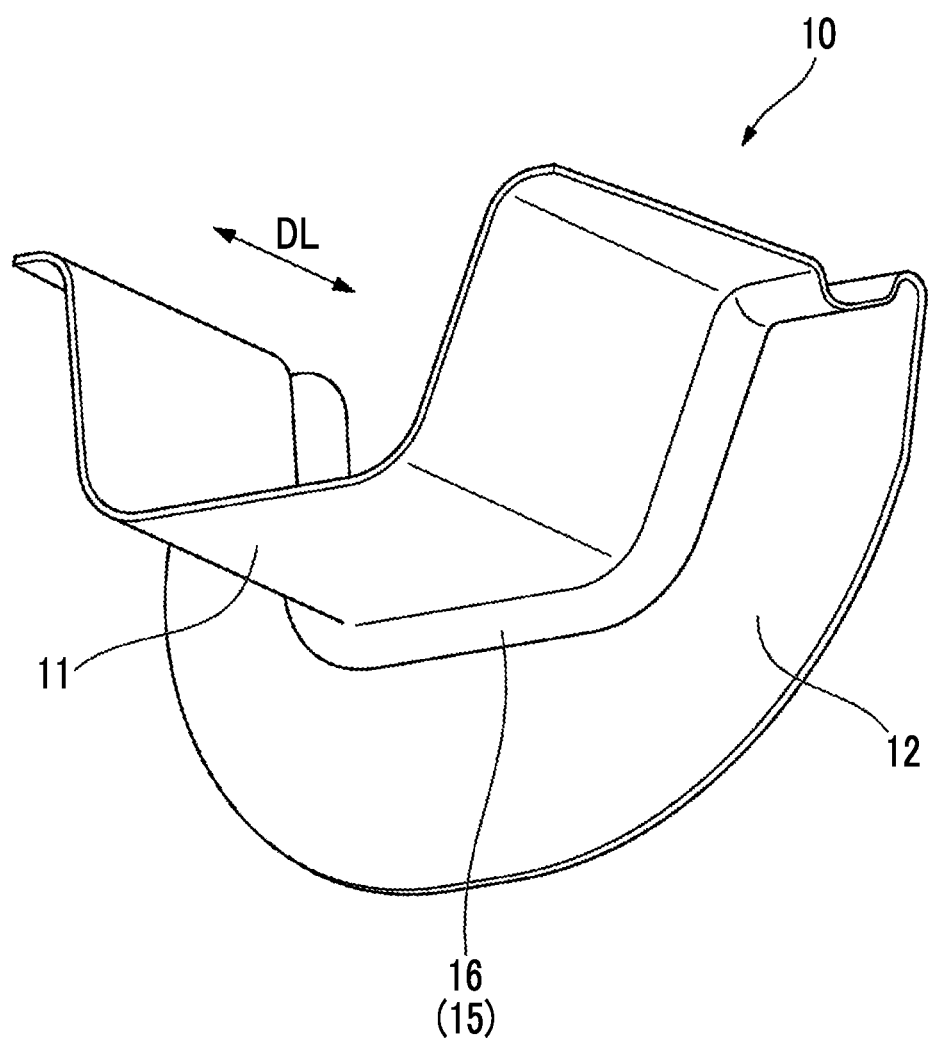
FIG. 8 is a perspective view of the fuel tank dam in the first embodiment.
Figure 9:
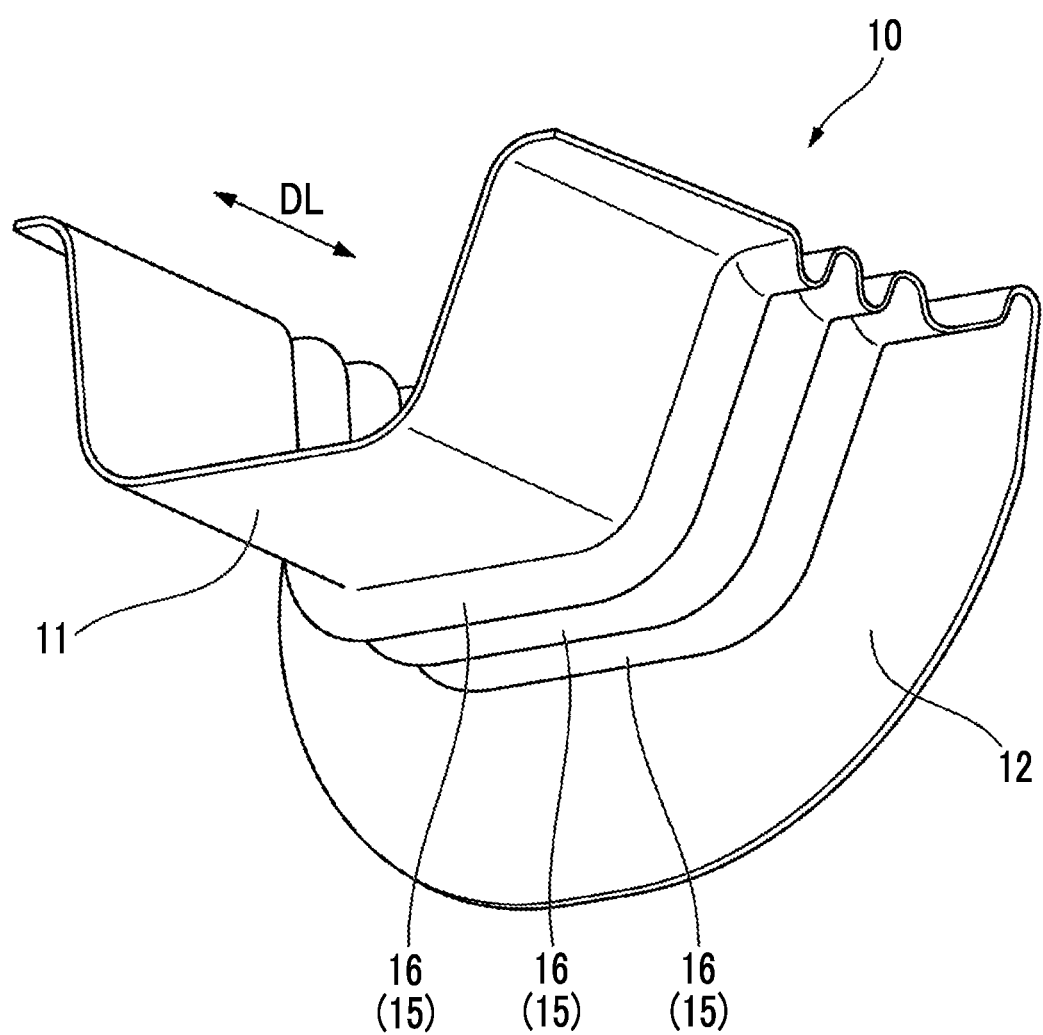
FIG. 9 is a perspective view of the fuel tank dam in the first embodiment.

In this embodiment, the bellows 15 is provided with two folded portions 16. However, the number of folded portions 16 may be one, as shown in FIG. 8, or may be three, as shown in FIG. 9. The number of the folded portions 16 slightly affects the deformation rate of the bellows 15. However, the trends described above do not significantly change.

Further, the number of folded portions 16 may be four or more.

As a modification example, the second section 12 may have a doubler structure by stacking a plate covering the second section 12 on the second section 12 from the bellows 15 side. Since the deformation of the second section 12 can be suppressed due to the doubler structure, a decrease in sealing properties can be further suppressed. The doubler structure may be applied to the entire second section 12 or may be applied to a part of the second section 12.

In this embodiment, the continuous section 32 connects the second section 12 and the third section 13. However, as a modification example, a continuous section 32' may have an R shape which does not intersect a surface which is in contact with the inner side of the third section 13, when the fuel tank 61 is deformed.

Figure 10:
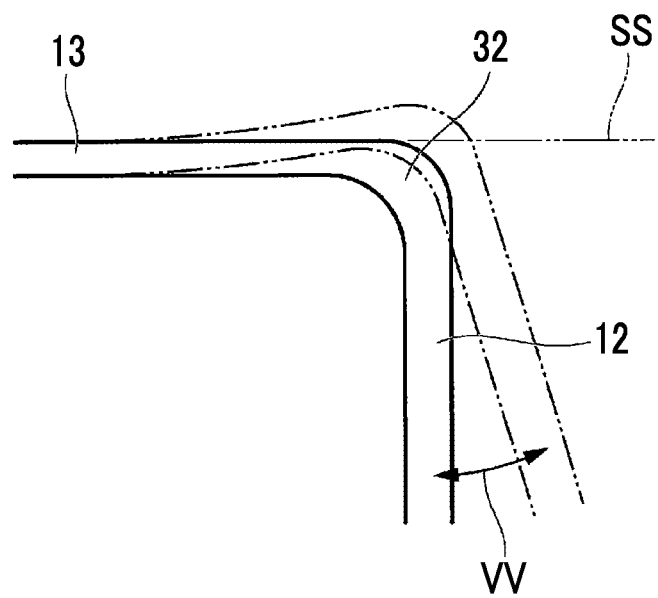
FIG. 10 is a sectional view of a continuous section in the first embodiment.

As shown in FIG. 10, there is a case where the continuous section 32 protrudes beyond a surface SS which is in contact with the inner side of the third section 13, with respect to deformation VV of the fuel tank 61. In this case, there is a possibility that the third section 13 may interfere with the skin 1, the stringer 2, or the like to reduce sealing properties.

Figure 11:
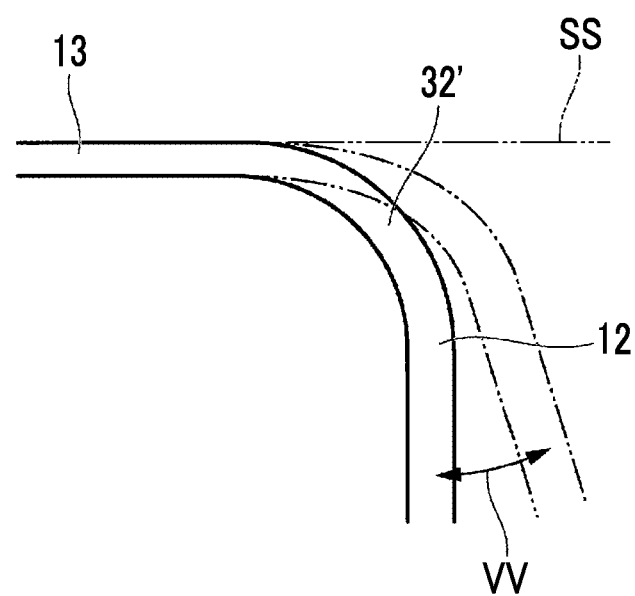
FIG. 11 is a sectional view of a continuous section in a modification example of the first embodiment.

In contrast, as shown in FIG. 11, the continuous section 32' has an R shape which does not intersect the surface SS which is in contact with the inner side of the third section 13, with respect to the deformation VV of the fuel tank 61. In other words, when the fuel tank 61 is deformed, the continuous section 32' maintains the R shape that gets away from the surface SS which is in contact with the inner side of the third section 13 with increasing distance from the third section 13.

By forming the continuous section 32' with such a configuration, the continuous section 32' does not easily protrude beyond the surface SS which is in contact with the inner side of the third section 13. Therefore, the third section 13 does not easily interfere with the skin 1, the stringer 2, or the like, with respect to the deformation VV of the fuel tank 61.

Therefore, the fuel tank dam 10 can further suppress a decrease in sealing properties, with respect to the deformation VV of the fuel tank 61.

The deformation characteristics such as the magnitude, frequency, and direction of the deformation VV of the fuel tank 61 have values determined in advance.

Second Embodiment (Configuration)

Figure 12:
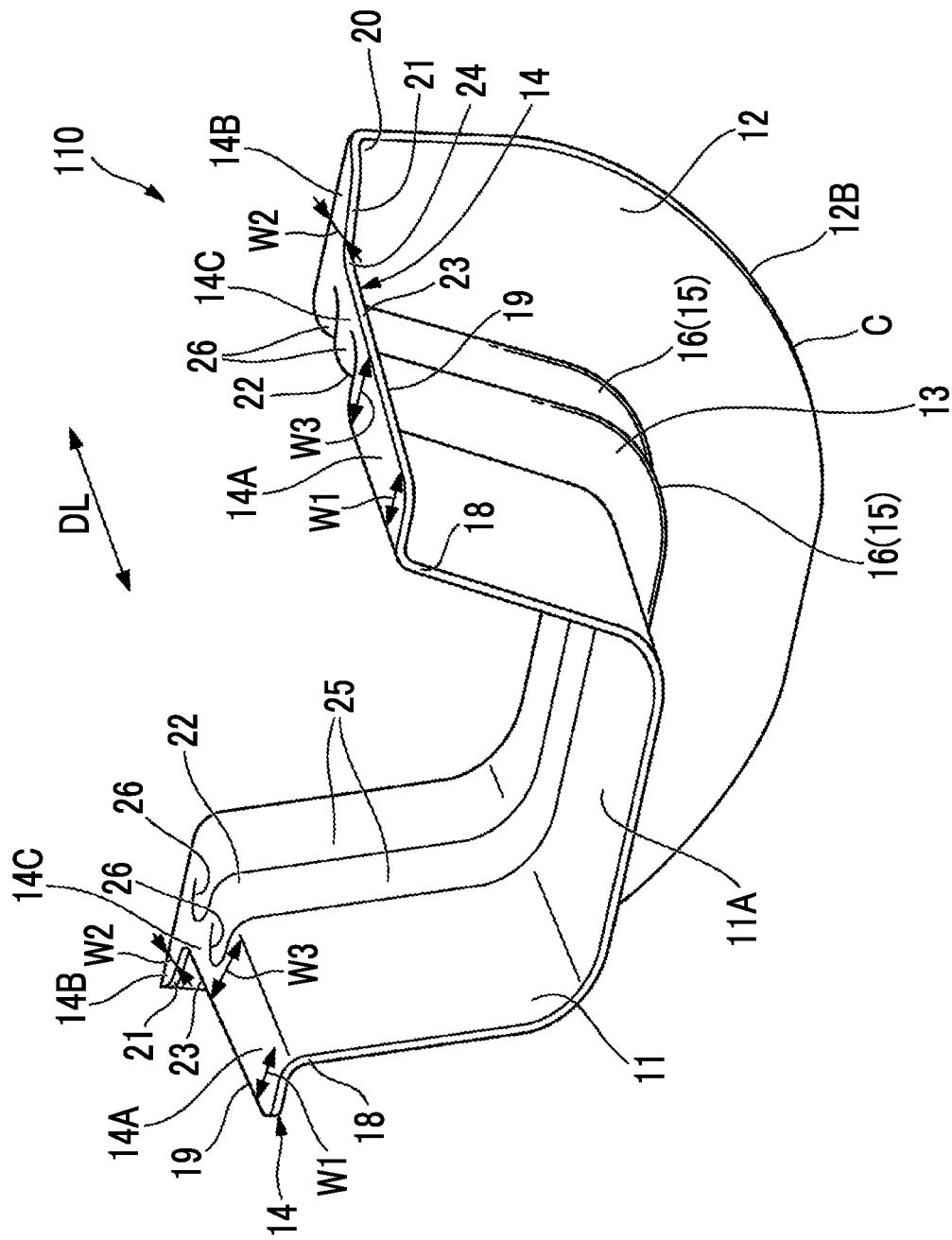
FIG. 12 is a perspective view of a fuel tank dam in a second embodiment.
Figure 13:
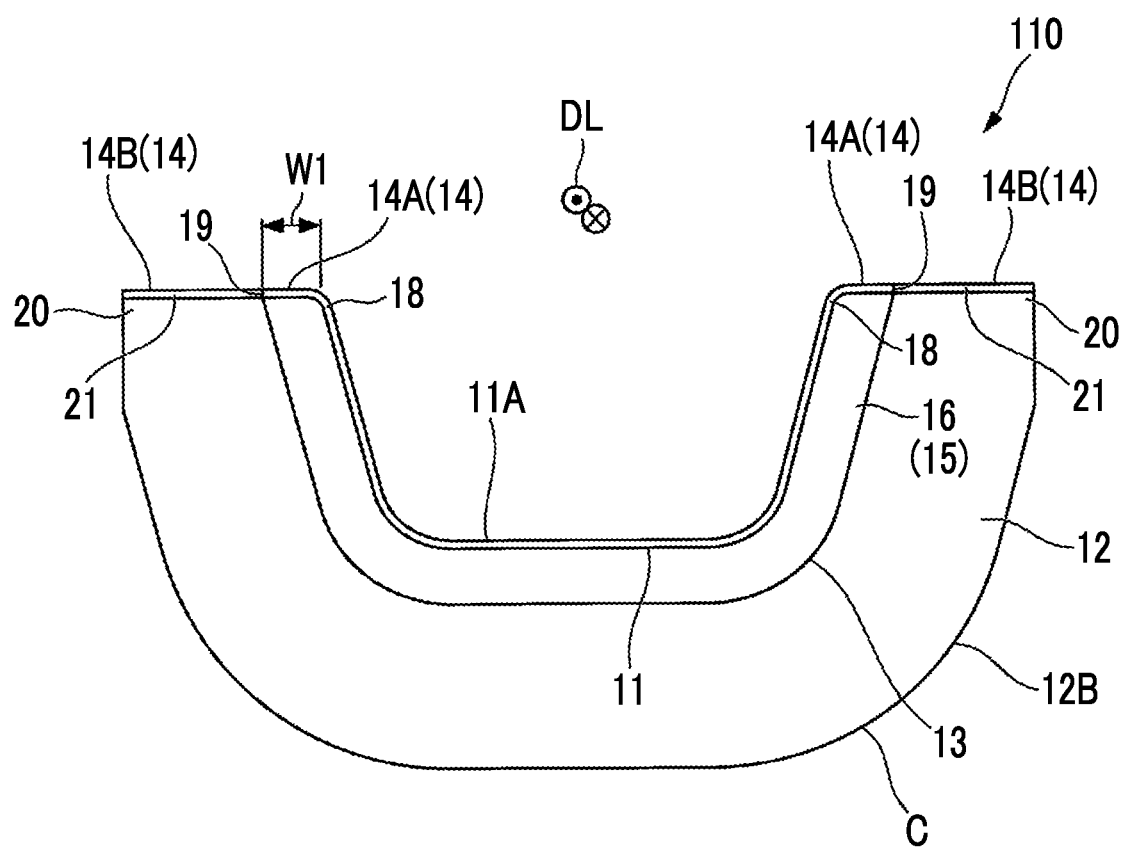
FIG. 13 is a front view of the fuel tank dam in the second embodiment as viewed from the first section side.
Figure 14:
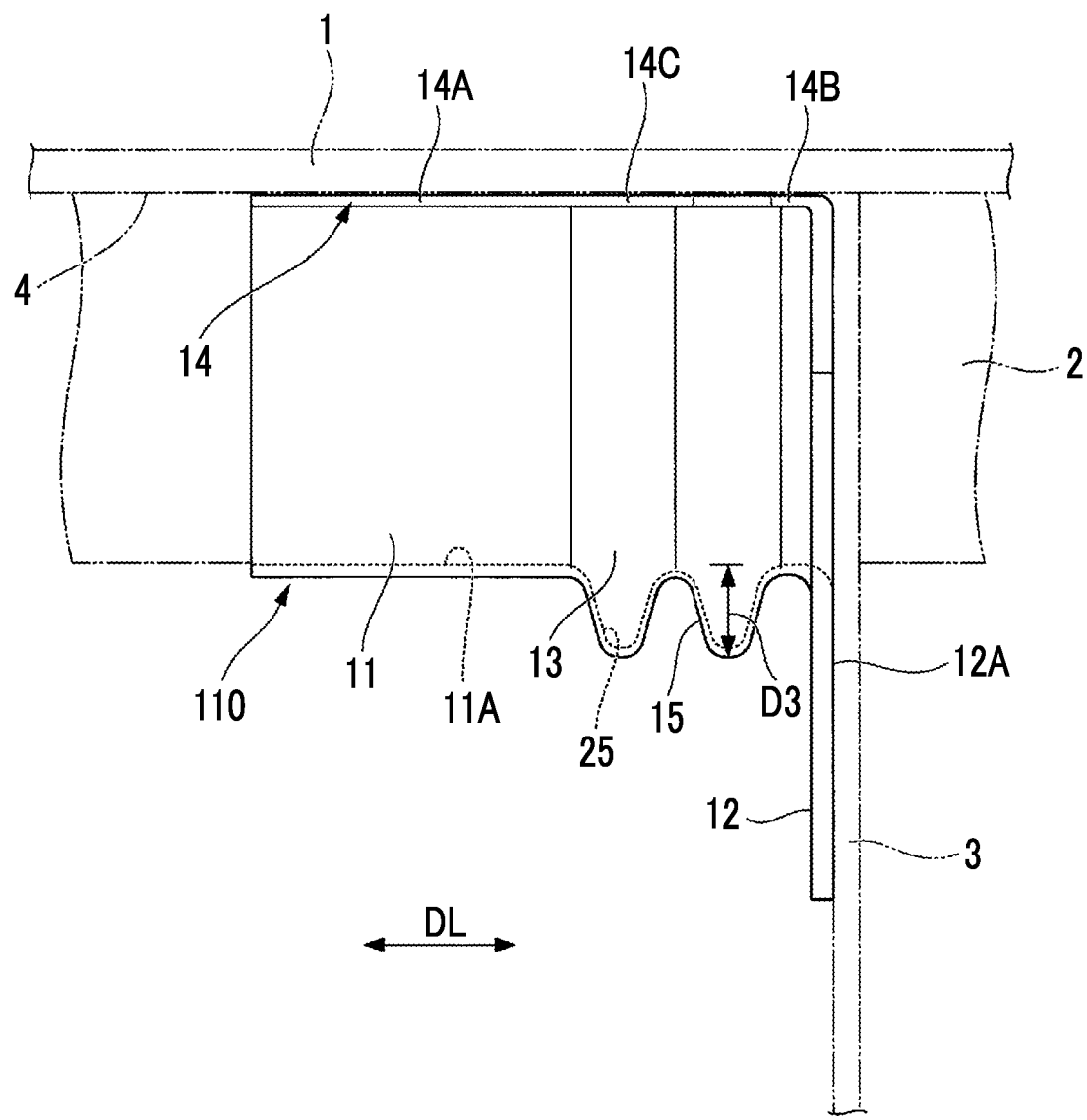
FIG. 14 is a side view of the fuel tank dam in the second embodiment.

FIG. 12 is a perspective view of a fuel tank dam in a second embodiment. FIG. 13 is a front view of the fuel tank dam in the second embodiment as viewed from the first section side. FIG. 14 is a side view of the fuel tank dam in the second embodiment.

As shown in FIGS. 12 to 14, a fuel tank dam 110 according to the second embodiment further includes a flange section 14 in the fuel tank dam 10 according to the first embodiment.

As shown in FIG. 14, in the fuel tank dam 110, the flange section 14 extends along the skin 1 and is fixed to the inner surface 4 of the skin 1 with, for example, a sealant or the like interposed therebetween. The flange section 14 includes a first flange section 14A, a second flange section 14B, and a third flange section 14C, each of which is continuous. Each of the first flange section 14A, the second flange section 14B, and the third flange section 14C illustrated in this embodiment is formed in a flat plate shape having a uniform continuous thickness, and has a flat surface conforming to the inner surface 4 of the skin 1.

As shown in FIGS. 12 and 13, the first flange section 14A extends toward the outer side (in other words, the side away) from each of two edge portions 18 which are located on the side close to the skin 1 of the first section 11 having the U-shaped cross section. In the first flange section 14A, an end edge 19 thereof on the side far from the first section 11 is formed in a linear shape parallel to the edge portion 18 of the first section 11 extending in the longitudinal direction DL. The first flange section 14A in this embodiment is formed in a strip shape long in the longitudinal direction DL. A width W1 of the first flange section 14A is formed to be smaller than the length L1 of the first section 11 in the longitudinal direction DL. Further, the width W1 of the first flange section 14A illustrated in this embodiment is formed to be larger than a depth dimension D3 (refer to FIG. 14) of the folded portion 16 of the bellows 15.

The second flange section 14B extends from an edge portion 20 on the side close to the skin 1 of the second section 12 toward the side where the first section 11 is disposed in the longitudinal direction DL. In the second flange section 14B, an end edge 21 thereof on the side far from the second section 12 is inclined so as to come close to the second section 12 with increasing distance from the bellows 15. That is, the second flange section 14B is formed in a tapered shape such that a width W2 thereof is gradually narrowed as it comes close to the outer edge 12B of the second section 12.

The third flange section 14C extends toward the outer side (in other words, the side away) from each of two edge portions 22 located on the side close to the skin 1 of the third section 13 formed to have a U-shaped cross section. A width W3 of the third flange section 14C is made larger than the thickness T3 of the bellows 15. The third flange section 14C in this embodiment is formed in a width wider than the depth dimension D3 (refer to FIG. 14) of the folded portion 16 having the largest depth, among the plurality of folded portions 16 configuring the bellows 15. The third flange section 14C is formed, whereby the bellows 15 is inhibited from elastic deformation in the vicinity of the third flange section 14C, and thus the bellows 15 becomes more difficult to be elastically deformed in the vicinity of the third flange section 14C than in a portion far from the third flange section 14C.

A plurality of recessed portions 26 which communicate with recessed grooves 25 formed inside the plurality of folded portions 16 of the bellows 15 are formed in the third flange section 14C. The cross-sectional shape of the recessed groove 25 and the cross-sectional shape of the recessed portion 26 are the same shape. That is, the recessed groove 25 formed inside the folded portion 16 communicates with a space above the third flange section 14C without being blocked by the third flange section 14C in the extending direction of the recessed groove 25.

In the third flange section 14C in this embodiment, an end edge 23 thereof on the side far from the bellows 15 is formed in a linear shape. More specifically, the end edge 23 of the third flange section 14C is formed in a linear shape extending in the longitudinal direction DL. Further, the end edge 23 of the third flange section 14C is formed continuously with the end edge 19 of the first flange section 14A described above. In other words, the end edge 23 of the third flange section 14C is disposed on an extension line of the end edge 19 of the first flange section 14A formed in a linear shape. Then, the end edge 23 of the third flange section 14C in this embodiment and the end edge 21 of the second flange section 14B are connected through a recessed shape curved portion 24. That is, the flange section 14 is formed so as to extend over the edge portion 18 of the first section 11 and the edge portion 20 of the second section 12. Further, the flange section 14 is formed so as to extend over the edge portion 20 of the second section 12 and the edge portion 22 of the third section 13.

(Operation and Effect)

According to the fuel tank dam 110 of this embodiment, as in the first embodiment, the thickness of the bellows 15 is related to the thickness of the second section 12 so as to be able to suppress a decrease in sealing properties.

Therefore, the deformation of parts other than the bellows 15 can be suppressed, and therefore, the fuel tank dam 110 can suppress a decrease in sealing properties.

Further, according to the fuel tank dam 110 of the embodiment, the edge portion 22 of the third section 13, which is disposed adjacent to the skin 1 and is hardly deformed, is fixed to the skin 1 through the flange section 14, and thus the sealing properties between the third section 13 and the skin 1 can be enhanced. On the other hand, at a position apart from the skin 1 in the third section 13, the bellows 15 can be deformed to follow the relative displacement between the first section 11 and the second section 12. Therefore, it is possible to obtain sufficient sealing performance while allowing the relative displacement between the stringer 2 and the rib 3.

Further, the flange section 14 is formed in a width wider than the thickness of the bellows 15, so that the third section 13 and the skin 1 can be stably fixed to each other at the edge portion 22 of the third section 13 where the bellows 15 is formed. As a result, it is possible to improve reliability.

Further, the flange section 14 is formed in a width wider than the depth dimension D3 of the bellows 15, so that it is possible to secure necessary and sufficient sealing performance.

Further, the flange section 14 is formed so as to extend over the edge portion 18 of the first section 11 and the edge portion 22 of the third section 13, so that both of the gaps between the first section 11 and the skin 1 and the gaps between the third section 13 and the skin 1 can be simultaneously sealed by one continuous flange section 14. Further, the first section 11 and the third section 13 can be stably fixed to the skin 1.

Further, the flange section 14 is formed so as to extend over the edge portion 22 of the third section 13 and the edge portion 20 of the second section 12, so that the gaps between the first section 11, the second section 12, and the third section 13, and the skin 1 can be simultaneously sealed by one continuous flange section 14. Further, the first section 11, the second section 12, and the third section 13 can be stably fixed to the skin 1.

Further, the flange section 14 has a flat surface conforming to the inner surface 4 of the skin 1, so that the flange section 14 can be easily formed. Further, for example, when the flange section 14 is fixed to the skin 1 with a sealant or the like interposed therebetween, it is possible to easily perform the fixing work.

For example, in the embodiments described above, the case where the flange section 14 has a flat surface has been described. However, for example, the flange section 14 may have a curved surface corresponding to the inner surface 4 of the skin 1.

Further, in the embodiments described above, the case has been described where the first flange section 14A, the second flange section 14B, and the third flange section 14C are formed in a continuous series without interruption. However, the first flange section 14A, the second flange section 14B, and the third flange section 14C may be divided with minute gaps or the like formed therebetween.

Further, in the embodiments described above, the case where the third flange section 14C is formed in a width wider than the depth dimension D3 of the folded portion 16 is illustrated. However, as long as a flat surface wider than the thickness of the bellows 15 is formed in at least a part of the edge portion 22 of the third section 13, the width of the third flange section 14C is not limited to the width W3 of the third flange section 14C described above.

Further, the size of the width W1 of the first flange section 14A is not limited to the size in the embodiment described above.

Some embodiments have been described above. However, these embodiments are presented as examples and are not intended to limit the scope of the invention. These embodiments can be implemented in various other forms, and various omissions, replacements, and changes can be made. These embodiments or modifications thereof are intended to be included in the invention described in the claims and an equivalent scope thereof.

For example, in each of the embodiments described above, the case where the folded portions 16 are connected by a curved surface is illustrated. However, the folded portion 16 is not limited to the above-described shape as long as a mountain fold and a valley fold are continuous shapes.

For example, in each of the embodiments described above, the case where the first section 11 is formed longer than the third section 13 in the longitudinal direction DL in which the stringer 2 extends has been described. The length L1 of the first section 11 may be formed equal to the length L3 of the third section 13 or shorter than the length L3 of the third section 13, for example, in a case where a large number of folded portions 16 of the third section 13 are formed, or the like.

Further, in each of the embodiments described above, the case where the stringer 2 is formed so as to have a trapezoidal cross section is illustrated. However, the cross-sectional shape of the stringer 2 is not limited to a trapezoid. For example, it may be an I-cross section, an H-cross section, or the like. In a case where the stringer 2 does not have a trapezoidal shape in this manner, for example, it is favorable if a spacer or the like is provided between the fuel tank dam of each of the embodiments described above and the stringer 2.

For example, in each of the embodiments described above, the case where the fuel tank dam is fixed to the inner surface 4 of the skin 1 which is disposed above has been described. However, the direction in which the fuel tank dam is mounted to the gap G is not limited to the above direction.

For example, in each of the embodiments described above, the case where the fuel tank 61 is provided in the main wing 70 has been described. However, the fuel tank 61 is not limited to a configuration in which it is provided in the main wing 70.

INDUSTRIAL APPLICABILITY

According to the aspects described above, a decrease in sealing properties can be suppressed.

REFERENCE SIGNS LIST

1: skin (outer plate)
2: stringer (first structural component)
3: rib (second structural component)
4: inner surface
5: end edge
6: cutout portion
10: fuel tank dam
11: first section
11A inner surface
12: second section
12A: surface
12B: outer edge
13: third section
14: flange section
15: bellows
16: folded portion
18: edge portion
19: end edge
20: edge portion
21: end edge
22: edge portion
23: end edge
24: curved portion
25: recessed groove
26: recessed portion
32: continuous section
32': continuous section
61: fuel tank
61A: fuel tank
61B: fuel tank
70: main wing
110: fuel tank dam
C: curved portion

The invention claimed is:

1. A fuel tank dam that closes a gap between a first structural component fixed to an inner surface of an outer plate of a fuel tank and a second structural component having a cutout portion into which the first structural component is inserted, the fuel tank dam comprising:
a first section which is formed to be fixed to the first structural component;
a second section having a surface extending in a direction intersecting with the first section, and which is formed to be fixed to the second structural component; and
a third section having bellows provided with at least one folded portion, and disposed between the first section and the second section,
wherein the first section, the second section, and the third section are integrated,
wherein a deformation rate of the bellows, which is a ratio of a deformation amount of the bellows to a deformation amount of the fuel tank dam in a longitudinal direction thereof when a constant load is applied to the surface of the second section in the longitudinal direction, is 60% or more, and
wherein T3 is equal to or more than 0.508 mm and is less than 1.524 mm, and T2 is equal to or less than 4.064 mm, where a thickness of the bellows is the T3, and a thickness of the second section is the T2.

2. The fuel tank dam according to claim 1, further comprising:
- a continuous section connecting the second section and the third section,
- wherein the continuous section has a shape in which an outside surface of the continuous section does not intersect a surface which is in contact with an inner side of the third section, when the fuel tank is deformed.

3. The fuel tank dam according to claim 1, further comprising:
- a continuous section connecting the second section and the third section,
- wherein when the fuel tank is deformed, the continuous section maintains a shape in which an outside surface of the continuous section separates away from a surface which is in contact with an inner side of the third section with an increase in a distance from the third section.

4. The fuel tank dam according to claim 1, wherein the bellows are allowed to elastically deformed to allow a relative displacement of the first and second sections.

\* \* \* \* \*